United States Patent Office 2,843,590
Patented July 15, 1958

2,843,590
PREPARATION OF PIPERAZINES

Joseph J. Scigliano and Edgar C. Britton, Midland, Mich., assignors to The Dow Chemical Company, Midland, Mich., a corporation of Delaware No Drawing. Application March 23, 1956
Serial No. 573,343

13 Claims. (Cl. 260—268)

This invention relates to the preparation of piperazines by an ameliorated technique utilizing the hydrohalides of certain aminoalkylaminoalkanol compounds.

It would be advantageous, and it is among the principal objectives of the present invention, to provide a superior method for the preparation of piperazine and substituted piperazines from certain aminoalkylaminoalkanol compounds and, more particularly, from their hydrohalides. It would also be particularly beneficial if a method would be made available for the preparation of piperazines that did not require catalytic assistance for optimum results and in which significant and satisfactory product yields, feasibly as high as in the neighborhood of 70–80 percent and higher, might consistently be obtained in short periods of time. It would be additionally advantageous, and it is among the ancillary objectives of the present invention, to provide a more facile method for the preparation of piperazines that can easily be practiced while employing conventional and commonly available apparatus fabricated from desirable types of materials of construction.

These and other desiderata may be realized according to the method of the present invention which comprises dispersing in an inert dispersant vehicle a hydrohalide of an aminoalkylaminoalkanol compound which, advantageously, may contain from 4 to 16 carbon atoms in its molecule, said aminoalkylaminoalkanol having the general formula:

HO—CHR—CHR—NH—CHR—CHR—NH₂ wherein each R may be independently selected from the group consisting of a hydrogen atom and a substituent alkyl radical which, advantageously within the foregoing limitation, may contain from 1 to 4 carbon atoms; cyclizing the hydrohalide of the aminoalkylaminoalkanol compound by heating it to an elevated temperature while it is being maintained in liquid dispersion in the inert vehicle until substantial portions of the hydrohalide of the aminoalkylaminoalkanol compound are converted to a piperazine hydrohalide in the reaction mass; and thereafter recovering a piperazine product therefrom. Mono- or dihydrohalide aminoalkylaminoalkanol compounds or mixtures thereof may be utilized. Frequently, greater yields may be achieved when the dihydrohalide form of the aminoalkylaminoalkanol is utilized. Beneficially, the reaction may be conducted with agitation of the dispersed materials. If desired, the hydrohalide may be initially formed in the method of the invention by acidifying the corresponding alkanolamine compound with a hydrohalic acid or other hydrohalide providing material.

Advantageously, the hydrohalide of the alkanolamine compound, particularly dihydrohalides, may be converted while the reaction mass is being maintained at a pH which is not more acidic than about 3.5. More advantageously, the reaction may be conducted with the pH of the reaction mass being maintained in the neighborhood of about 5. Such conditions are more favorable to the employment of stainless steel and other apparatus comprised of equivalent materials of construction that may be susceptible to excessive corrosion and erosion and to causing product contamination when they are subjected to severely acid exposures.

Piperazine and substituted piperazine products including 2,5-dimethylpiperazine and the like may be prepared with high conversions of the starting materials and correspondingly high yields of the desired piperazine products, particularly when the dihydrohalides of aminoalkylaminoalkanols are employed. For example, yields of the piperazine and substituted piperazine products from the converted dihydrohalides of the aminoalkylaminoalkanol compounds that are generally in the neighborhood of 70 to 80 percent and which frequently may be even higher may consistently and reliably be experienced with the present method. In addition, especially when the pH of the reaction mass is purposely maintained at a level which is out of the excessive acidity range (which, incidentally, may occur normally when monohydrohalides or mixed hydrohalides having the mole ratio of hydrohalide to aminoalkylaminoalkanol nearer to one are involved), it is possible to prepare and disperse the hydrohalide of the aminoalkylaminoalkanol compound and to conduct the reaction in stainless steel and like apparatus.

The reaction which is involved in the method of the present invention is believed to be represented by the following, which also includes the preliminary hydrohalide formation with a hydrohalic acid:

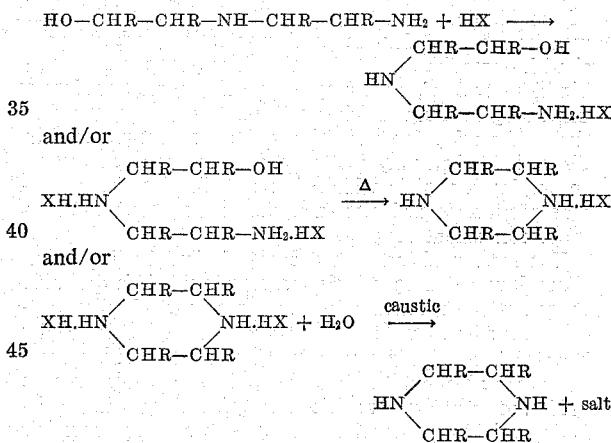

wherein the starting aminoalkylaminoalkanol hydrohalide compound advantageously may have the described characteristics and X is a halogen. As indicated, either the monohydrohalide form or the dihydrohalide form of the aminoalkylaminoalkanol compound, or mixtures thereof, may be employed. Generally, higher yields may be achieved when the mole ratio of hydrohalide to aminoalkylaminoalkanol present in the starting hydrohalide is at least about 1.95 to 1, respectively.

A wide variety of substituted piperazines in addition to piperazine may be prepared by the method of the present invention, depending on the type and variety of substitution which is present in the starting aminoalkylaminoalkanol compound that is employed. In the following tabulation is set forth some of the possibilities that exist when various substituent groups are present in a starting aminoalkylaminoalkanol compound having the general formula:

HO—CHR—CHR′—NH—CHR″—CHR‴—NH₂ when R, R′, R″ and R‴ are selected in the indicated manner from the group consisting of a hydrogen atom and an alkyl radical (which is designated by the letter A in the table):

| Substituents in Starting Aminoalkylaminoalkanol | | | | Type of Substitution in Piperazine Product |
|---|---|---|---|---|
| R | R' | R'' | R''' | |
| H | H | H | H | Unsubstituted Piperazine. |
| A | H | H | H | 1-Alkyl Piperazine. |
| H | A | H | H | Do. |
| H | H | A | H | Do. |
| H | H | H | A | Do. |
| A | A | H | H | 2,3-Dialkyl Piperazine. |
| H | H | A | A | Do. |
| A | H | A | H | 2,5-Dialkyl Piperazine. |
| H | A | H | A | Do. |
| A | H | H | A | 2,6-Dialkyl Piperazine. |
| H | A | A | H | Do. |
| A | A | A | H | 2,3,5-Trialkyl Piperazine. |
| A | A | H | A | Do. |
| A | H | A | A | Do. |
| H | A | A | A | Do. |
| A | A | A | A | 2,3,5,6-Tetraalkyl Piperazine. |

As is apparent, various mixed substituents may be involved. Especial advantage may frequently be obtained by preparing 2,5-dimethylpiperazine and 2,5-diethylpiperazine in accordance with the invention.

The inert liquid vehicle that is employed as a medium in which to conduct the reaction should, as is implied, be substantially inert to the aminoalkylaminoalkanol compounds, the hydrohalide adducts of the aminoalkylaminoalkanol compound, the intermediate piperazine hydrohalides and the piperazine products that may be involved. It should permit ready isolation of the desired products without difficulties due to the formation of troublesome azeotropic mixtures. The inert vehicle may be a solvent for the starting materials or for the desired intermediate and the final products, or for any combinations thereof, or it may effectively be employed as a dispersing medium which may or may not require agitation and mixing for maintaining the reactant material in dispersion. In many instances it may be advantageous to employ a vehicle which does not dissolve the piperazine product in order to facilitate product isolation in a more convenient manner.

The inert vehicle may have any desired boiling point. When lower boiling vehicles are employed, it is desirable to conduct the reaction under pressure to facilitate attainment of a suitable reaction temperature. It is usually beneficial to employ a vehicle which has a boiling point in excess of about 175° C. In many cases, it may be preferred to utilize a vehicle having a boiling point which is appreciably greater than that of the starting materials or the products. Advantageously, in order to generally avoid conducting reactions under pressure, a vehicle that boils in excess of about 250° C. may be employed. Diphenyl ether and similar aromatic ethers including diphenylyl phenyl ether (which is also known as phenyl xenyl ether) and naphthyl phenyl ether may frequently be utilized with especial benefit as relatively high boiling inert dispersant vehicles in the practice of the present invention. Biphenyl may also be satisfactorily utilized for such purposes. In certain instances, however, relatively lower boiling hydrocarbons and other materials may be employed suitably. For example, various alkyl benzenes and alkylated diphenyl ethers are lower boiling materials that may also be useful as dispersant vehicles in the practice of the invention. Mixtures of suitable miscible liquids may also be made to constitute the vehicle.

The optimum temperature for the reaction will, as is apparent, vary with the particular aminoalkylaminoalkanol compound that is employed as well as with the boiling point of the inert vehicle that is being utilized. Ordinarily, the reaction may be conducted advantageously at a temperature between about 175 and 300° C. Frequently, a temperature between about 240 and 275° C. may more advantageously be employed for the reaction.

As has been indicated, the hydrohalide intermediate may be conveniently formed for use in practicing the method of the invention by reacting each mole of the corresponding aminoalkylaminoalkanol compound with from about 1 to about 2 moles of a hydrohalic acid with greater yields being frequently attainable, as mentioned, when at least about 1.95 moles of the acid is employed per mole of the aminoalkylaminoalkanol. While it is usually more convenient to prepare the hydrohalide before effecting the dispersion in the inert vehicle, it is possible, and it is within the comprehension of the present invention, to prepare the hydrohalide after the starting aminoalkylaminoalkanol compound has been dispersed in the inert dispersant vehicle. Most often, hydrochloric or hydrobromic acids are preferably employed as the hydrohalic acid that is utilized. In addition, it also is possible to prepare the hydrohalide from such acidic materials as an ammonium halide, including ammonium chloride, which will provide the necessary hydrohalide group or groups for the aminoalkylaminoalkanol compound.

The pH of the reaction mass may be effectively controlled in various ways in order to maintain it in a beneficial operating range of greater suitability for the employment of stainless steel and the like apparatus although, as mentioned, it may not require adjustment when monohydrohalides are employed. However, in cases where excessive acidity may be a problem, as when an aminoalkylaminoalkanol dihydrohalide is utilized, the pH of the reaction mass can be controlled within desirable limits by preparing the dihydrohalide with a slight amount of the aminoalkylaminoalkanol over stoichiometric requirements to insure that excessive acidity may be avoided in the reaction mass or a minor quantity of the alkanolamine compound may be incorporated in the reaction mass when a formed dihydrohalide is employed. The effective excess to be employed for such purposes in particular instances when dihydrohalides are being utilized can be readily determined by those skilled in the art. In an analogous manner, the pH of the reaction mass, regardless of the mole ratio of hydrohalide to aminoalkylaminoalkanol that may be contained therein, may be controlled readily by incorporating other materials therein which are about equivalent bases to or are weaker that the aminoalkylaminoalkanol compound which is utilized. For example, such basic materials as tributylamine triethylamine and the like or such buffer ingredients as tri-sodium phosphate and various sodium acid phosphates may usually be suitable for such purposes.

It is convenient to practice the invention with the material in liquid dispersion being converted by batchwise techniques using apparatus equipped with efficient agitating means for the purpose. By such a procedure, exceptionally high conversions of the starting materials to give excellent high yields of the desired products can commonly be obtained easily within 8–10 hours and frequently in much shorter periods of time, especially when dihydrohalides of the aminoalkylaminoalkanols are employed. However, if it is preferred, the method can be conducted on a continuous basis by passing the reactant materials in the inert dispersant vehicle through a suitable reaction chamber.

The piperazine product may be recovered after neutralization of the piperazine hydrohalide intermediate with caustic or other suitable neutralizing substance. The isolation may be accomplished according to various techniques which are apparent to those skilled in the art. For example, solvent extraction, filtration, distillation and precipitation or crystallization procedures may be employed in any desired or necessary manner in order to obtain the product in a required pure condition.

The invention is further illustrated in and by the following examples although it is not intended to be limited thereto or restricted thereby:

Example I

A unimolar quantity of the dihydrochloride of 2-(2-aminoethylamino) ethanol (also known as 2 - hydroxyethylene diamine) was prepared by slowly mixing in the cold about 170 milliliters (2 moles) of concentrated aqueous hydrochloric acid having a specific gravity of about 1.18 with about 104 grams (1 mole) of 2-(2-aminoethylamino) ethanol. To the resulting dihydrochloride was added about 300 grams of molten phenyl xenyl ether. The reaction mass was heated and stirred under a pressure about 100 millimeters of mercury until it was substantially free from water after which it was placed under atmospheric pressure and its temperature raised to about 265–270° C. The reaction mass, with continued stirring, was synthermally maintained for a period of about an hour after which it was cooled to a temperature of about 75–80° C. and neutralized with the addition of about 80 grams of solid sodium hydroxide and 50 milliliters of water. The neutralized reaction mass was fractionated under a pressure of about 100 millimeters of mercury. The distillate in the range from about 75 to 150° C. was collected and analyzed. About 90 percent of the starting material was found to have been converted. The yield of piperazine, based on the converted starting material, was about 87.5 percent. The overall piperazine yield was about 78.8 percent.

Example II

Three additional runs were performed in an analogous manner to that set forth in Example I using the same starting materials under different reaction conditions and, in two of the runs, with a different dispersant vehicle. The pertinent data and the results obtained in each of the runs is reproduced in the following tabulation.

| Run | "B" | "C" | "D" |
|---|---|---|---|
| Moles of 2-(2-amino-ethylamino) ethanol employed. | 1.25 | 1.0 | 1.0. |
| Moles of hydrochloric acid employed. | 2.5 | 2.0 | 2.0. |
| Inert Vehicle | Diphenyl Ether. | Phenyl xenyl ether. | Diphenyl Ether. |
| Quantity of Inert Vehicle Employed. | 300 ml | 300 gms. | 100 ml. |
| Temperature of Reaction, °C | 240–250 | 260–265 | 240–250. |
| Time of Reaction, hours | 3.5 | 1 | 4. |
| Conversion of starting materials, percent. | 85 | 90 | 92. |
| Yield of Piperazine, based on converted starting materials, percent. | 88.6 | 86 | 79. |
| Overall Piperazine Yield, percent | 75.2 | 77.5 | 72.5. |

Example III

About 85 milliliters (1 mole) of concentrated hydrochloric acid having a specific gravity of about 1.18 was mixed in the cold with about 104 grams (1 mole) of 2-(2-aminoethylamino) ethanol. About 200 grams of molten phenyl xenyl ether was added to the resulting monohydrochloride. The reaction mass, in a 3-neck, 2 liter flask equipped with an agitator, was heated and stirred under a vacuum of about 100 millimeters of mercury to free it from water. It was then heated and stirred under atmospheric pressure for about 1½ hours while the temperature was being maintained between about 265° C. and 275° C. At the conclusion of this period, the reaction mass was cooled and neutralized with about 41 grams of solid sodium hydroxide, having a purity of about 97.5 percent, which was dissolved in about 50 milliliters of water. The neutralized reaction mass was fractionated under a pressure of about 100 millimeters of mercury to collect the distillate in the range from about 84° C. to about 140° C. About 93 percent of the starting aminoalkylaminoalkanol was found to have been converted with about a 43 percent yield of piperazine being obtained in the recovered distillate.

Similar good results may be obtained when hydrochlorides of other aminoalkylaminoalkanols are converted to substituted piperazine products, including 2,5-dimethylpiperazine and 2,5-diethylpiperazine or when hydrobromides are employed in place of hydrochlorides. Likewise, good results may be had when any of the mentioned lower boiling inert mediums or their equivalents are employed under suitable pressure in place of phenyl xenyl ether or diphenyl ether.

What is claimed is:

1. Method for preparing a piperazine product having the general formula:

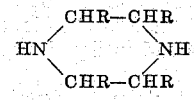

wherein each R is independently selected from the group consisting of a hydrogen atom and an alkyl radical containing from 1 to 4 carbon atoms, from the hydrohalide of an aminoalkylaminoalkanol compound which contains from 4 to 16 carbon atoms in its molecule, said aminoalkylaminoalkanol compound having the general formula:

wherein, within the foregoing limitation, each R is independently selected from the group consisting of a hydrogen atom and a substituent alkyl radical containing from 1 to 4 carbon atoms, which comprises dispersing the hydrohalide of the aminoalkylaminoalkanol compound in an inert dispersant vehicle; cyclizing the hydrohalide of the aminoalkylaminoalkanol compound by heating it to an elevated temperature while it is being maintained in liquid dispersion in the inert vehicle to convert substantial portions of the hydrohalide of the aminoalkylaminoalkanol compound are converted to a piperazine hydrohalide product in the reaction mass; and thereafter recovering a piperazine product therefrom.

2. Method for preparing a piperazine product having the general formula:

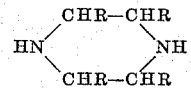

wherein each R is independently selected from the group consisting of a hydrogen atom and an alkyl radical containing from 1 to 4 carbon atoms, from the hydrohalide of an aminoalkylaminoalkanol compound which contains from 4 to 16 carbon atoms in its molecule, which method comprises dispersing in an inert dispersant vehicle an aminoalkylaminoalkanol compound having the general formula:

wherein, within the foregoing limitation, each R is independently selected from the group consisting of a hydrogen atom and a substituent alkyl radical containing from 1 to 4 carbon atoms; contacting each mole of said aminoalkylaminoalkanol compound with from about 1 to about 2 moles of a hydrohalic acid while said aminoalkylaminoalkanol compound is dispersed in said inert vehicle to form a hydrohalide of said aminoalkylaminoalkanol compound dispersed in said inert vehicle; cyclizing the hydrohalide of the aminoalkylaminoalkanol compound by heating it to an elevated temperature while it is being maintained in liquid dispersion in the inert vehicle to convert substantial portions of the hydrohalide of the aminoalkylaminoalkanol compound to a piperazine hdyrohalide product in the reaction mass; and thereafter recovering a piperazine product therefrom.

3. The method of claim 1 wherein the hydrohalide which is employed is a monohydrohalide of the aminoalkylaminoalkanol compound.

4. The method of claim 1 wherein the mole ratio of hydrohalic groups to aminoalkylaminoalkanol compound in the hydrohalide which is employed is at least about 1.95:1, respectively.

5. The method of claim 1 wherein the hydrohalide which is employed is a dihydrohalide of the aminoalkylaminoalkanol compound.

6. In the method of claim 1, cyclizing the hydrohalide of the aminoalkylaminoalkanol compound by heating it to a temperature between about 175° C. and 300° C.

7. In the method of claim 1, cyclizing the hydrohalide of the aminoalkylaminoalkanol compound by heating it to a temperature between about 240° C. and 275° C.

8. The method of claim 1 wherein pressure is employed to maintain the hydrohalide of the aminoalkylaminoalkanol compound in liquid dispersion in the inert vehicle.

9. The method of claim 1 wherein the inert vehicle is diphenyl ether.

10. The method of claim 1 wherein the inert vehicle is phenyl xenyl ether.

11. In the method of claim 1, heating a dihydrohalide of the aminoalkylaminoalkanol compound until an overall yield of at least about 70 to 80 percent of a piperazine product may be recovered from the reaction mass.

12. The method of claim 1, wherein the dispersion of said hydrohalide of the aminoalkylaminoalkanol compound in the inert dispersant vehicle is mechanically agitated while it is being heated.

13. The method of claim 1 wherein the product is piperazine and the aminoalkylaminoalkanol is 2-(2-aminoethylamino) ethanol.

References Cited in the file of this patent

FOREIGN PATENTS 595,430    Great Britain             Dec. 4, 1947